US007587639B2

(12) United States Patent
Marisetty et al.

(10) Patent No.: US 7,587,639 B2
(45) Date of Patent: Sep. 8, 2009

(54) SYSTEM AND METHOD FOR ERROR INJECTION USING A FLEXIBLE PROGRAM INTERFACE FIELD

(75) Inventors: Suresh K. Marisetty, Fremont, CA (US); Rajendra Kuramkote, Newcastle, WA (US); Koichi Yamada, Los Gatos, CA (US); Scott D. Brenden, Bothell, WA (US); Kushagra V. Vaid, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 715 days.

(21) Appl. No.: 10/985,502

(22) Filed: Nov. 9, 2004

(65) Prior Publication Data

US 2006/0112307 A1 May 25, 2006

(51) Int. Cl.
*G06F 11/00* (2006.01)

(52) U.S. Cl. ........................................................ 714/41

(58) Field of Classification Search .................... 714/41
See application file for complete search history.

(56) References Cited

U.S. PATENT DOCUMENTS 5,671,352 A * 9/1997 Subrahmaniam et al. ...... 714/41
5,890,162 A * 3/1999 Huckins .................. 707/104.1
6,691,250 B1 * 2/2004 Chandiramani et al. ....... 714/25
6,961,874 B2 * 11/2005 Lodrige ....................... 714/38
2002/0010833 A1 * 1/2002 Yoshihiro ................... 711/112
2003/0172321 A1 * 9/2003 Wolin et al. .................... 714/41
2004/0078683 A1 * 4/2004 Buia et al. ..................... 714/37
2006/0112307 A1 * 5/2006 Marisetty et al. .............. 714/11

OTHER PUBLICATIONS

First Office Action from Foreign Counterpart Chinese Patent Application No. 200510138060.0, mailed Aug. 2, 2007, 10 pgs. total, (translation included).

* cited by examiner

*Primary Examiner*—Emerson C Puente
(74) *Attorney, Agent, or Firm*—Blakely, Sokoloff, Taylor & Zafman LLP

(57) ABSTRACT

A system and method for injecting hardware errors into a microprocessor system is described. In one embodiment, a software interface between system software and system firmware is established. Software test and debug for software error handlers may thus be supported. The software interface may support both a query mode call and a seed mode call. When a query mode call is issued, it may request whether or not the system firmware and hardware support the injection of a specified kind of error. A return from this call may be used to make a list of supported errors for injection. When a seed mode call is issued, the corresponding error may be injected into the hardware.

80 Claims, 7 Drawing Sheets

SYSTEM AND METHOD FOR ERROR INJECTION USING A FLEXIBLE PROGRAM INTERFACE FIELD

The present invention relates generally to microprocessor systems, and more specifically to microprocessor systems that may support the testing of software error handlers by commanding the injection of hardware errors into the system.

BACKGROUND

Hardware errors in a microprocessor may arise from numerous sources, such as cosmic ray strikes, over-temperature hot spots, supply voltage spikes, and many other sources. These hardware errors may propagate into the processor, platform, and software, causing data corruption which has the potential to bring down the system, lead to errant system behavior, or cause silent data corruption. To increase reliability and availability, many microprocessor systems may implement error detection, error containment, error correction, and error recovery schemes. Several of these functions may be performed in the hardware or in system firmware. However, in some circumstances the operating system software or application software may need to receive error messages from hardware and act upon them using an error handler module.

The error handler module provides a challenge during the design and debug of the module itself. It may not be possible to adequately test its function without providing it with actual hardware errors. This may be performed at the microprocessor manufacturer's facility using specialized and costly hardware tools and instrumentation for injecting hardware errors at will. This may be extremely difficult to do at an operating system software vendor's facility or at an application software vendor's facility. They may not wish to obtain specialized and costly hardware which may be useful only for a limited set of processor revisions, nor may they have the trained personnel to operate it.

In some processor embodiments, there may be an error injection interface which would permit the injection of certain errors at will. However, these interfaces may vary between processor revision levels and therefore require extensive re-coding of any software for the control of the error injection. Again, this many not be a practical approach for the operating system software vendors or application software vendors.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION

The following description includes techniques for injecting hardware errors into a microprocessor system to facilitate the testing of software error handlers. In the following description, numerous specific details such as logic implementations, software module allocation, bus and other interface signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments, the invention is disclosed in the environment of an Itanium® Processor Family compatible processor (such as those produced by Intel® Corporation) and the associated system and processor firmware. However, the invention may be practiced in other kinds of processors, such as the Pentium® compatible processors (such as those produced by Intel® Corporation), an X-Scale® family compatible processor, or any of a wide variety of different general-purpose processors from any of the processor architectures of other vendors or designers. Additionally, some embodiments may include or may be special purpose processors, such as graphics, network, image, communications, or any other known or otherwise available type of processor in connection with its firmware.

Figure 1:
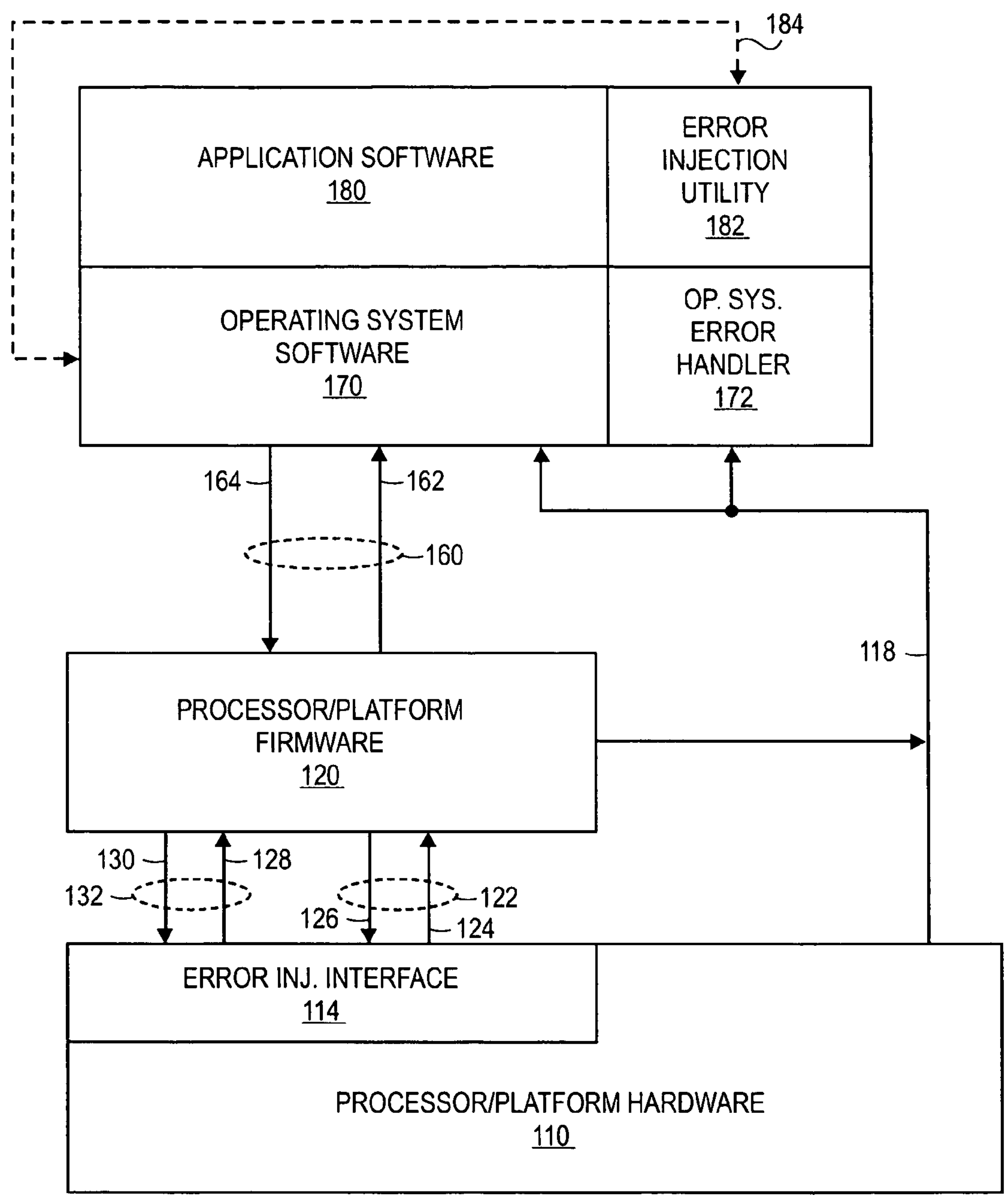
FIG. 1 is a diagram of error injection in a system with firmware, according to one embodiment of the present disclosure.

Referring now to FIG. 1, a diagram of error injection in a system with firmware is shown, according to one embodiment of the present disclosure. In the FIG. 1 embodiment, processor/platform hardware 110 may include one or more microprocessors and various supporting chips, such as system memory, memory controllers, input/output controllers, system busses or other forms of system interconnects, and various input/output devices. In some embodiments, some of these supporting chips may be collected into an integrated "chipset". Processor/platform hardware 110 may include an error injection interface 114 which may permit outside influence on the operation of processor/platform hardware 110. In one embodiment, error injection interface 114 may include registers or other communications interfaces to permit receiving commands to purposely inject various kinds of hardware errors into processor/platform hardware 110 in order to facilitate the testing, debugging, and validation of various software error handlers. It is noteworthy that the software error handlers should be validated when loaded in the complete error handling environment, which may also include hardware error handlers and firmware handlers. A particular error may be first handled by hardware, and may then be handed off to firmware, and finally may be handed off to software for resolution.

FIG. 1 shows several layers of software that may execute on processor/platform hardware 110. These may include one or more operating system software 170 and one or more application software 180. Each may have its own error handler, such as operating system error handler 172 and error injection utility 182. Operating system error handler 172 may receive various hardware error messages over an error message interface 118 when errors occur in processor/platform hardware 110. In varying embodiments, the error messages may arise from the hardware, or may be sent by the firmware after being invoked by the hardware. Once received by the operating system 170, the error messages may be passed via a software interface 184 to error injection utility 182.

It may be possible to have software directly communicate with error injection interface 114, but for various reasons this would not be preferable. An end-user testing operating system error handler 172 or error injection utility 182 would not necessarily know which kinds of errors could be injected into a particular version of processor hardware and platform hardware. A different software version would be required for each "stepping" or revision level of the processor and platform hardware. And, due to security concerns, there may be reasons that detailed knowledge of the error injection interface 114 should not be widely distributed.

Therefore, in one embodiment a software interface 160 may be defined between the software, which may include the operating system software 170 and application software 180, and the processor/platform firmware 120. Software interface 160 may permit the software to both inquire about what kinds support for error injection is present in a given environment, and also to task the actual error injection based upon that knowledge. The use of software interface 160 may advantageously permit software testing without requiring rewriting the software for each stepping level of hardware presented.

Software interface 160 may include two parts: a call 164 and a return 162. Call 164 may further be divided into two portions: a query mode and a "seed" or injection command mode. In query mode, the call may contain a request for an answer to the question of whether or not the support exists for injecting the described error. In one embodiment, the software may make a series of queries and keep a table or other form of record of the answers received. In this manner, the software may gain knowledge of the overall support that exists for injecting errors in a given processor and platform.

The software interface 160 may include the capacity to describe many more kinds of errors than would be expected in any particular implementation, in order to permit future growth. Data words sent as part of a query may include several fields in order to describe in detail the error whose injection would be desired. For example, a field may describe the severity of the error, which may include recoverable errors, fatal local errors, corrected errors, fatal global errors, and perhaps others. Another field may describe the particular hardware structure in which the error would occur, which may include the cache, the translation look-aside buffer (TLB), the system interconnect, the register file, micro-architectural structures, and perhaps others. A third field may describe the "trigger" or conditions under which the requested error would be injected. The trigger could in various embodiments be when a particular branch instruction is taken or not taken, when a particular buffer reaches a certain portion of its capacity, or the operation type being executed by the processor during which the error could occur. In other embodiments, many other triggers could be defined.

In one embodiment, the data words may include a field for error structure hierarchy level. In one embodiment, there may be four levels, with level 1 having the coarsest grain of description of errors and level 4 having the finest grain of description. An example of a level 1 error description would be a cache error of a particular severity and to a particular cache level. A level 2 error description could include all the level 1 description, and, in addition, whether the error would be in the data or tag portion of the cache, and the index and way of the cache in which the error would take place. A level 3 error description could include all the level 2 description, and, in addition, the precise address where the cache error would occur. The use of the error structure hierarchy levels may assist in permitting the gradual inclusion of more and more error types without having to re-characterize software interface 160. It is anticipated that in one embodiment a particular hierarchy level may be maintained across the differing hardware structures in which the error occurs. In other words, a particular hardware and firmware implementation may support only generic errors for injection in the various hardware structures, or may support very detailed specific errors for injection in the various hardware structures. However, in other embodiments the hierarchy levels may vary from one hardware structure to another.

The return 162 to the query call may simply include fields to characterize the requested error as either "supported" or "not supported". The return 162 may also give global answers to indicate which hierarchy levels of errors are supported. This may help the software tailor future queries in those embodiments where the hierarchy levels are constant across the varying hardware structures.

Call 164 may also include a "seed" or injection command mode. In one embodiment, the seed mode data words may be equivalent to the corresponding data words from the query mode, with the exception of a single bit that may serve as a flag to indicate whether the data word is to be interpreted as for query mode or seed mode. In other embodiments, data words for the seed mode may be coded differently than the corresponding data words for the query mode.

The return 162 to the seed mode call 164 may occur in circumstances where a seed mode call requests the injection of a non-supported error. In this case the return 162 may simply indicate that the error requested was not supported. In other embodiments, other information could be contained in the return 162.

As described above, the use of the software interface 160 may permit the operating system software 170 or the application software 180 to cause errors to be injected on command without detailed knowledge of the error injection interface 114. Such knowledge may be required for the interaction between the processor/platform firmware 120 and the error injection interface 114. In one embodiment, a query interface 132 may be used for processor/platform firmware 120 to request information about what kinds and hierarchy levels of error injection supported by error injection interface 114 in conjunction with processor/platform firmware 120. In other embodiments, processor/platform firmware 120 may be programmed to contain this information about the platform it is inserted into. This programming may in some embodiments take the form of a table or set of registers. In some embodiments, certain hardware errors may be emulated by processor/platform firmware 120 so there may be no need to interrogate error injection interface 114 for these errors.

In one embodiment, there may also be a tasking interface 122 for processor/platform firmware 120 to use when "seeding" (commanding the injection of) errors. In one embodiment, processor/platform firmware 120 may send tasking message over path 126 to the error injection interface 114. In one embodiment, these tasking messages may write to registers or other storage devices in error injection interface 114. Return path 124 may be used for error injection interface 114 to communicate status or non-support messages to processor/platform firmware 120.

Figure 2:
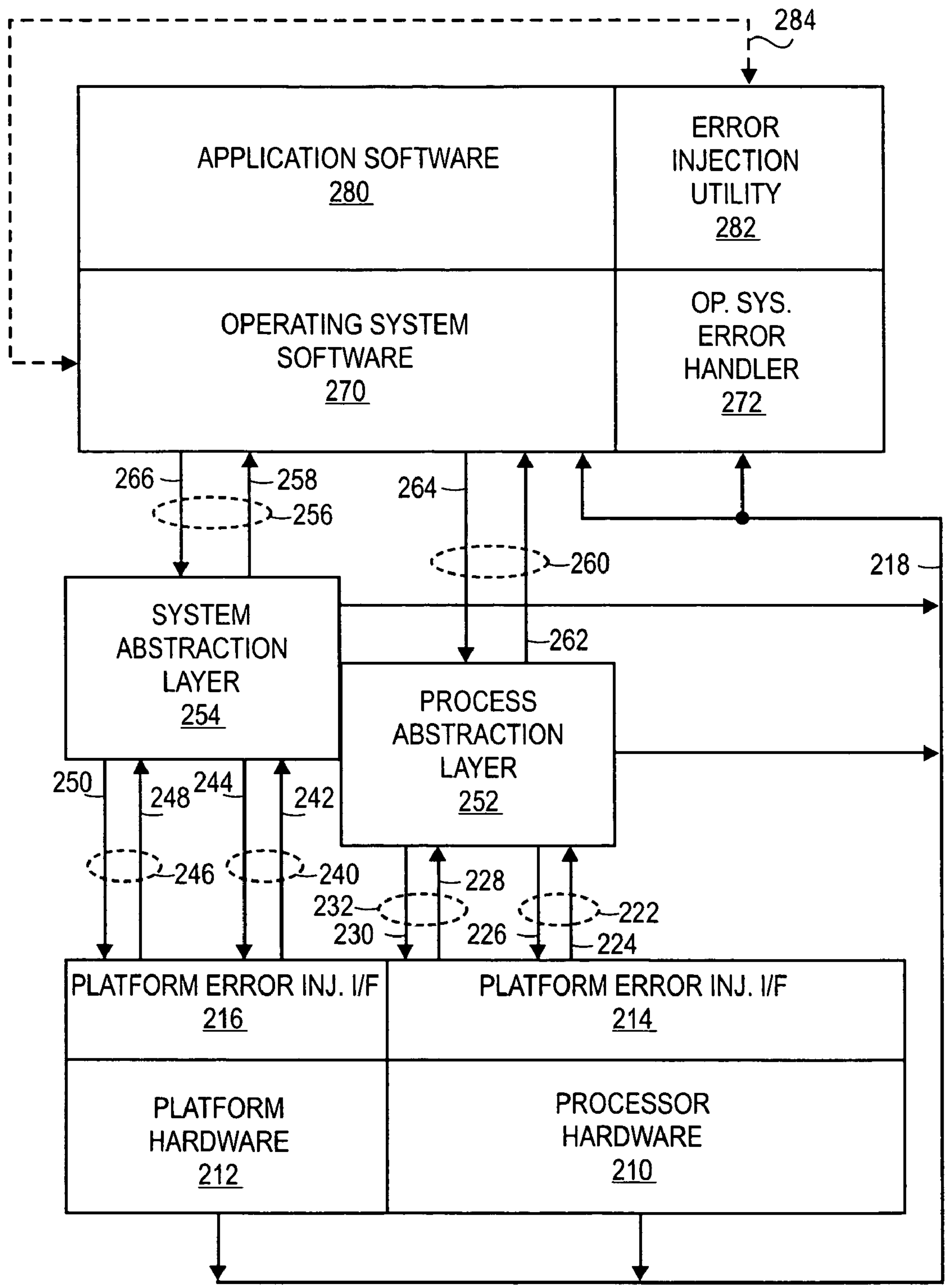
FIG. 2 is a diagram of error injection in a system with separate system and processor firmware, according to one embodiment of the present disclosure.

Referring now to FIG. 2, a diagram of error injection in a system with separate system and processor firmware is shown, according to one embodiment of the present disclosure. The FIG. 2 system may be generally similar to that of the FIG. 1 system, but the processor and platform firmware has been segregated into a processor abstraction layer (PAL) 252 which supports the processor hardware 210 and a system abstraction layer (SAL) 254 which supports the platform hardware 212. In one embodiment, the FIG. 2 system may use an Itanium® Processor Family compatible processor, such as those produced by Intel® Corporation, and the PAL 252 and SAL 254 developed for use thereon. In such an environment, error message interface 218 may be a machine-check-architecture (MCA) interface, capable of conveying errors detected in platform hardware 212 and processor hardware 210. In varying embodiments, the error messages may arise from the hardware, or may be sent by the PAL 252 after being invoked by the hardware, or may be sent by the SAL 254 after being invoked in turn by the PAL 252.

In one embodiment, software interface 260 may generally convey the same kinds of data words between the software and the PAL 252 as disclosed above in connection with software interface 160 of FIG. 1. In other embodiments, software interface 260 may be defined exactly as that of software interface 160 of FIG. 1. Platform related errors may require a second software interface 256 between the software and the SAL 254. The data words on call 264 of software interface 260 and on call 266 of software interface 256 may include fields for the severity of the error, the particular hardware structure in which the error would occur, and the "trigger" or conditions under which the requested error would be injected. Platform hardware structures for the SAL 254 software interface 256 may include a peripheral component interconnect (PCI) bus, an extended PCI (PCI-E) link, a common system interconnect (CSI) link, or other structures typically found on a system motherboard. Fields for hierarchy levels of errors may also be included. In the case of software interface 260, the particular hardware structure in which the error would occur may include structures within the processor: in the case of software interface 260, the particular hardware structure in which the error would occur may include structures within the platform outside the processor.

Figure 3:
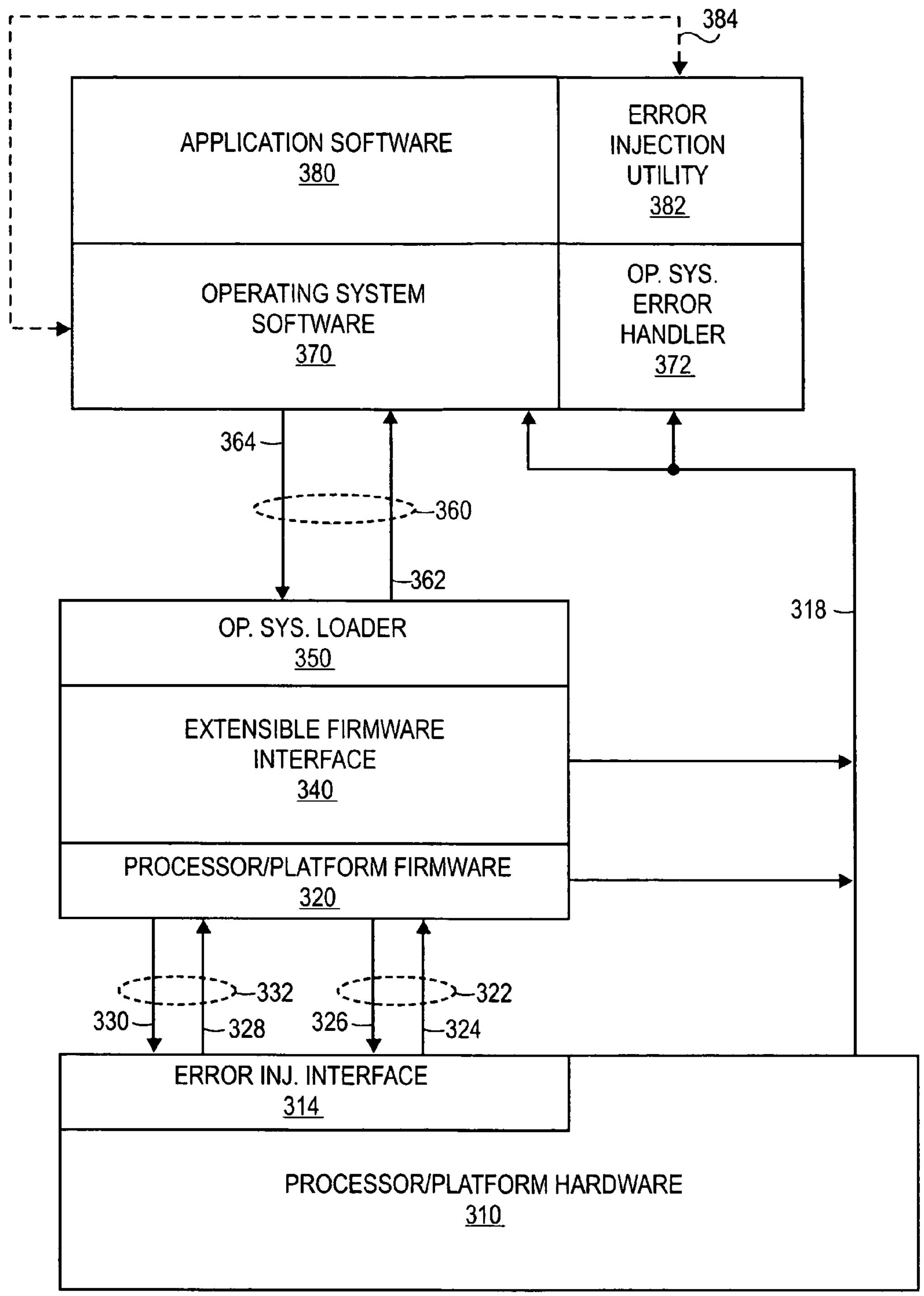
FIG. 3 is a diagram of error injection in a system with multilayer firmware, according to one embodiment of the present disclosure.

Referring now to FIG. 3, a diagram of error injection in a system with multilayer firmware is shown, according to one embodiment of the present disclosure. The FIG. 3 system may be generally similar to that of the FIG. 1 system, but the processor and platform firmware has been organized into a layered structure as shown. The basic functions of processor/platform firmware 320 are logically closest to the hardware. A common interface between the software and the processor/platform firmware may be presented by extensible firmware interface (EFI) 340. The EFI 340 may be used to present a virtual firmware/hardware machine to the software. Finally, a small lightweight operating system loader 350 may sit above the EFI 340. In one embodiment, the FIG. 2 system may use a Pentium® compatible processor, such as those produced by Intel® Corporation, and EFI 340 developed for use thereon. In such an environment, error message interface 318 may be a machine-check-architecture (MCA) interface, capable of conveying errors detected in processor/platform hardware 310. In varying embodiments, the error messages may arise from the hardware, or may be sent by the processor/platform firmware 320 after being invoked by the hardware, or by the EFI 340 after being invoked by the processor/platform firmware 320.

In one embodiment, software interface 360 may generally convey the same kinds of data words between the software and the EFI 340 as disclosed above in connection with software interface 160 of FIG. 1. In other embodiments, software interface 360 may be defined exactly as that of software interface 160 of FIG. 1. The data words on call 364 of software interface 360 may include fields for the severity of the error, the particular hardware structure in which the error would occur, and the "trigger" or conditions under which the requested error would be injected. Fields for hierarchy levels of errors may also be included.

Figure 4:
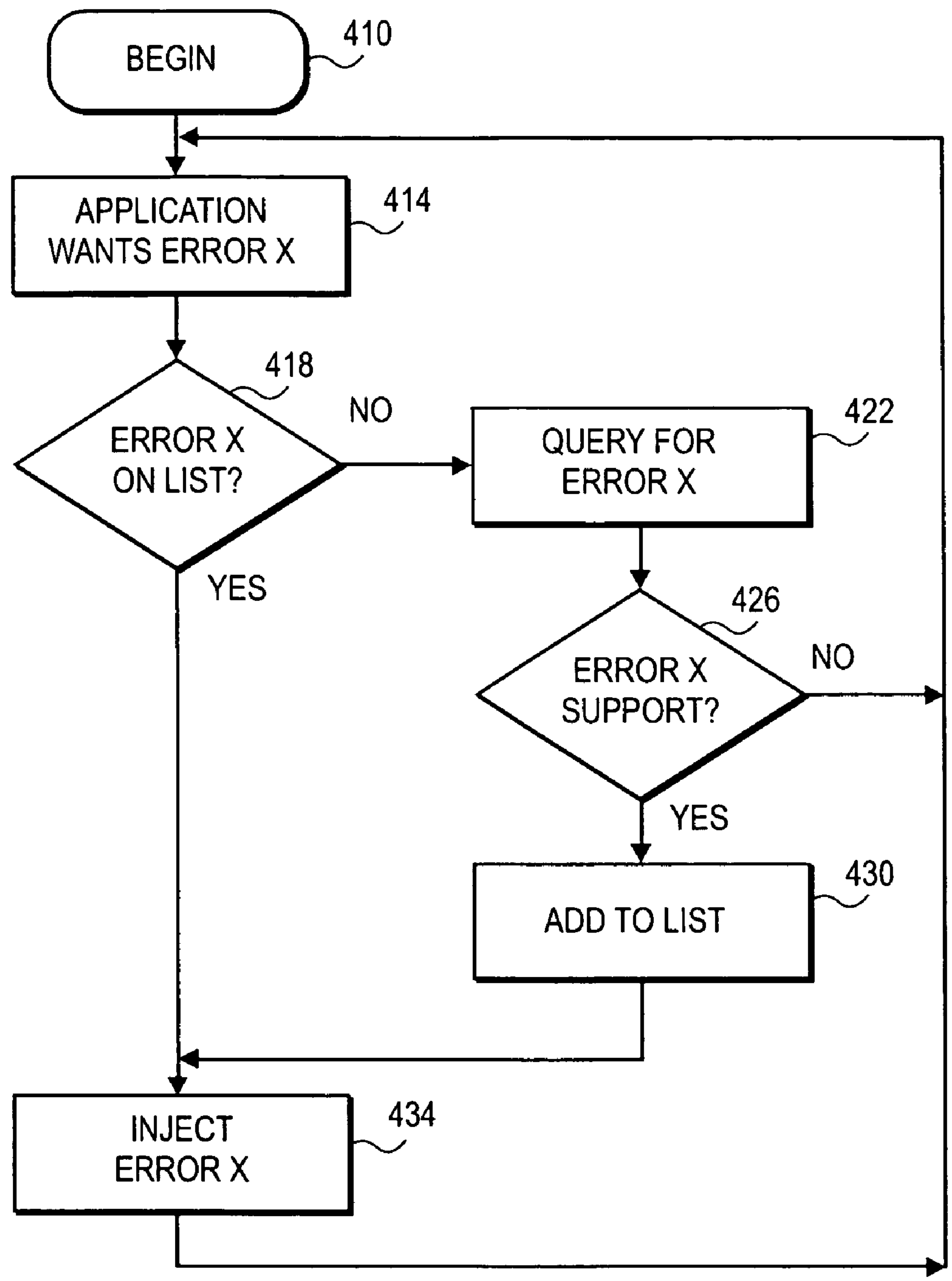
FIG. 4 is a flowchart of software utilizing an error injection system, according to one embodiment of the present disclosure.

Referring now to FIG. 4, a flowchart of software utilizing an error injection system is shown, according to one embodiment of the present disclosure. The FIG. 4 process may be executed by software connected to the firmware and hardware via a software interface such as software interface 160 of FIG. 1 above. When the process begins at block 410, it may wait at block 414 until the software desires to test its error handler with particular error X. In decision block 418, it may be determined whether error X is on a list maintained by the software of supported errors for injection. If so, then the process exits via the YES path. Then in block 434 the software issues a seed call and error X is injected into the hardware. The process then repeats at block 414.

If, however, in decision block 418 it is determined that error X is not on the list, then the process exits via the NO path, and in block 422 a query call is made concerning the support for error X. In decision block 426 it may be determined whether support for error X exists in the processor/platform hardware. If so, then the process exits via the YES path. In block 430 error X is added to the list before the software issues a seed call and error X is injected into the hardware at block 434. The process then repeats at block 414.

If, however in decision block 426 it is determined that support does not exist for error X, then the process exits via the NO path and returns to block 414.

Figure 5:
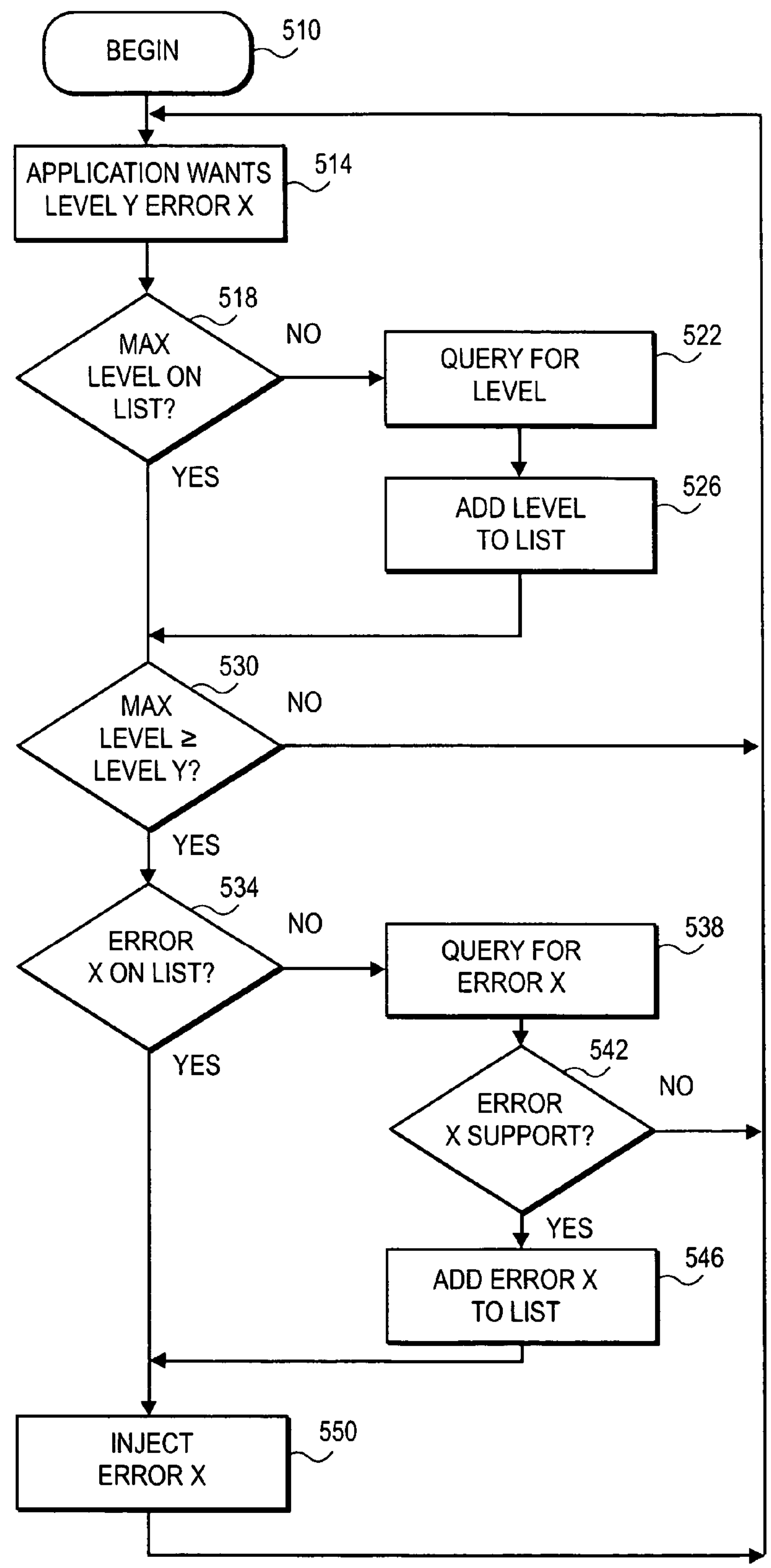
FIG. 5 is a flowchart of software utilizing an error injection system, according to another embodiment of the present disclosure.

Referring now to FIG. 5, a flowchart of software utilizing an error injection system is shown, according to another embodiment of the present disclosure. The FIG. 5 process may be executed by software connected to the firmware and hardware via a software interface such as software interface 160 of FIG. 1 above. The FIG. 5 process may differ from the FIG. 4 process in that the FIG. 5 system supports hierarchy levels that may be uniform across various portions of the hardware.

When the process begins at block 510, it may wait at block 514 until the software desires to test its error handler with particular error X corresponding to hierarchy level Y. In decision block 518 it may be determined whether a maximum hierarchy level supported is on the list maintained by software of errors and hierarchy levels supported by hardware. If not, then the process exits along the NO path and in block 522 a query call is issued to determine the level supported. Then in block 526 the hierarchy level is written to the list before entering decision block 530. If it is determined that the maximum hierarchy level is on the list, then the process exits via the YES path and enters decision block 530 directly.

In decision block 530 it may be determined whether the maximum hierarchy level on the list is greater than or equal to the desired level Y. If not, then the process exits along the NO path and returns to block 514. If so, then the process exits along the YES path and enters decision block 534.

In decision block 534, it may be determined whether error X is on the list maintained by the software of supported errors for injection. If so, then the process exits via the YES path. Then in block 550 the software issues a seed call and error X is injected into the hardware. The process then repeats at block 514.

If, however, in decision block 534 it is determined that error X is not on the list, then the process exits via the NO path, and in block 538 a query call is made concerning the support for error X. In decision block 542 it may be determined whether support for error X exists in the processor/platform hardware. If so, then the process exits via the YES path. In block 546 error X is added to the list before the software issues a seed call and error X is injected into the hardware at block 550. The process then repeats at block 514.

If, however in decision block 542 it is determined that support does not exist for error X, then the process exits via the NO path and returns to block 514.

Figure 6A:
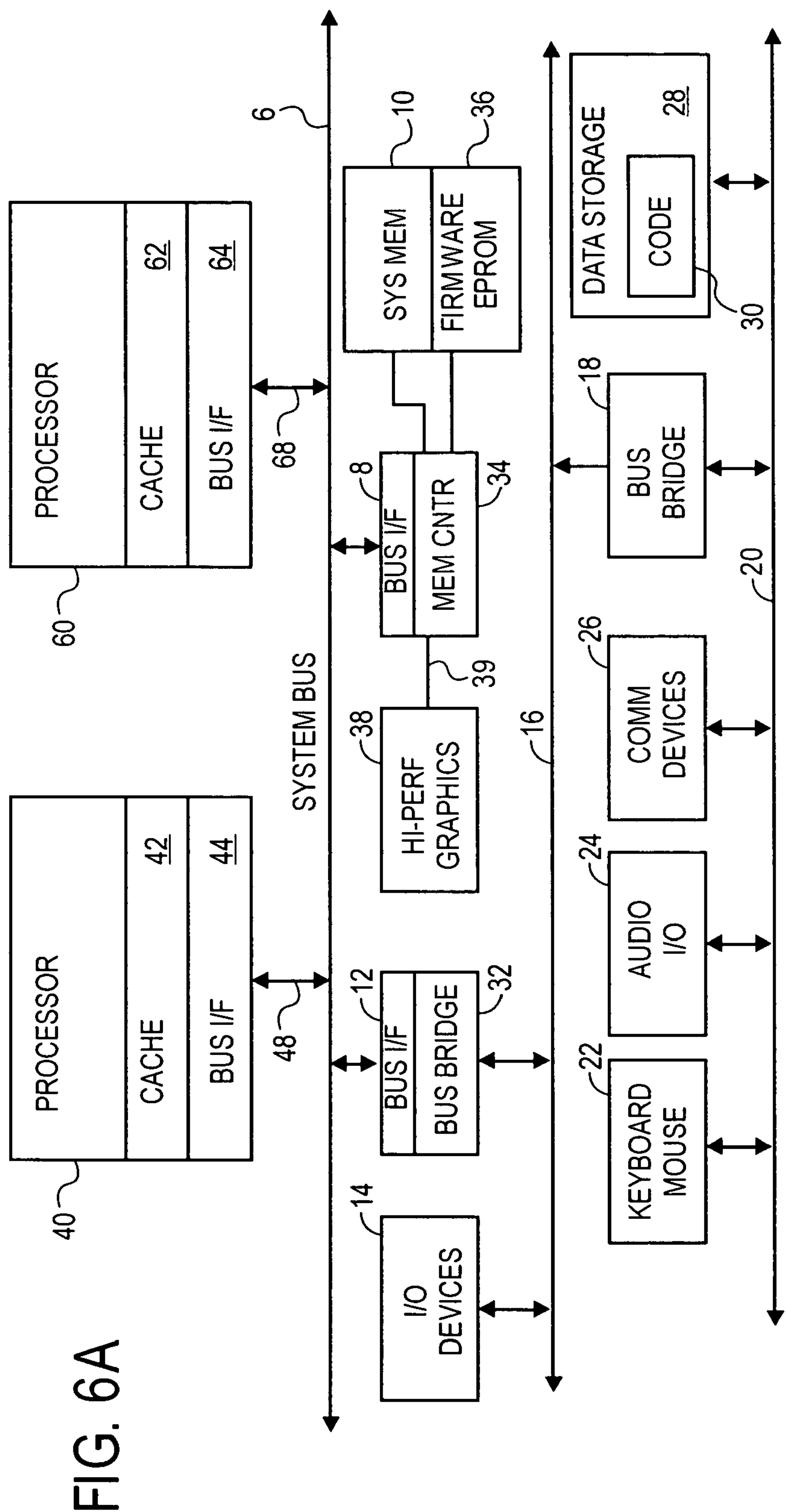
FIG. 6A is a schematic diagram of a system for injecting errors, according to an embodiment of the present disclosure.
Figure 6B:
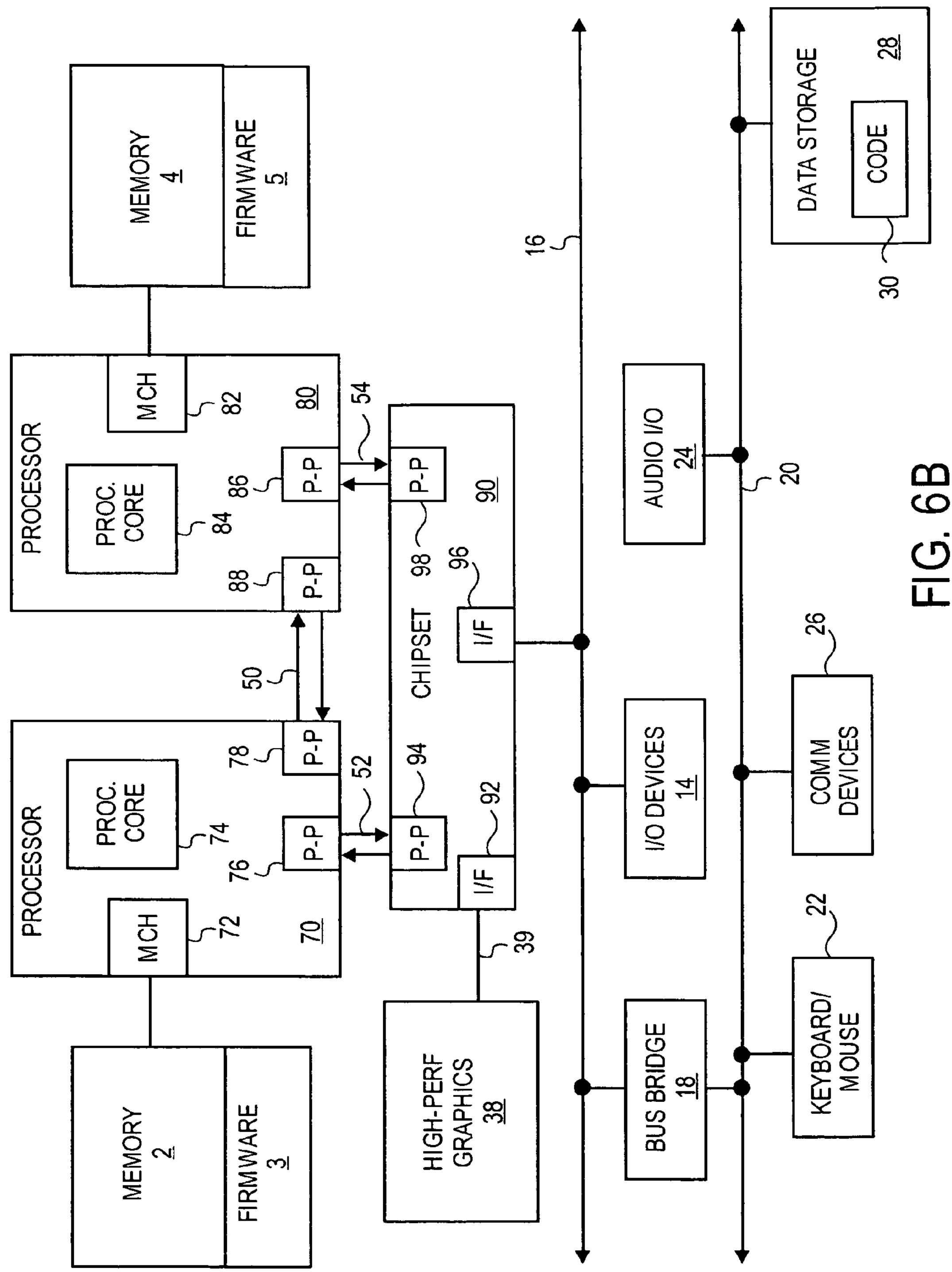
FIG. 6B is a schematic diagram of a system for injecting errors, according to another embodiment of the present disclosure.

Referring now to FIGS. 6A and 6B, schematic diagrams of systems for injecting errors are shown, according to two embodiments of the present disclosure. The FIG. 6A system generally shows a system where processors, memory, and input/output devices are interconnected by a system bus, whereas the FIG. 6B system generally shows a system where processors, memory, and input/output devices are interconnected by a number of point-to-point interfaces.

The FIG. 6A system may include one or several processors, of which only two, processors 40, 60 are here shown for clarity. Processors 40, 60 may include level one caches 42, 62. The FIG. 6A system may have several functions connected via bus interfaces 44, 64, 12, 8 with a system bus 6. In one embodiment, system bus 6 may be the front side bus (FSB) utilized with Pentium® class microprocessors manufactured by Intel® Corporation. In other embodiments, other busses may be used. In some embodiments memory controller 34 and bus bridge 32 may collectively be referred to as a chipset. In some embodiments, functions of a chipset may be divided among physical chips differently than as shown in the FIG. 6A embodiment.

Memory controller 34 may permit processors 40, 60 to read and write from system memory 10 and from a firmware erasable programmable read-only memory (EPROM) 36. In some embodiments the firmware may present an error injection software interface to software. In some embodiments firmware EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface. Memory controller 34 may direct data from system memory 10 to the high-performance graphics circuit 38 across high-performance graphics interface 39.

The FIG. 6B system may also include one or several processors, of which only two, processors 70, 80 are shown for clarity. Processors 70, 80 may each include a local memory controller hub (MCH) 72, 82 to connect with memory 2, 4 and with firmware 3, 5. In some embodiments the firmware may present an error injection software interface to software. Processors 70, 80 may exchange data via a point-to-point interface 50 using point-to-point interface circuits 78, 88. Processors 70, 80 may each exchange data with a chipset 90 via individual point-to-point interfaces 52, 54 using point to point interface circuits 76, 94, 86, 98. Chipset 90 may also exchange data with a high-performance graphics circuit 38 via a high-performance graphics interface 92.

In the FIG. 6A system, bus bridge 32 may permit data exchanges between system bus 6 and bus 16, which may in some embodiments be a industry standard architecture (ISA) bus or a peripheral component interconnect (PCI) bus. In the FIG. 6B system, chipset 90 may exchange data with a bus 16 via a bus interface 96. In either system, there may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention also relates to apparatus for performing the operations herein. This apparatus may be specialty constructed for the required purposes, or it may comprise a general purpose computer selectively activated or reconfigured by a computer program stored in the computer. Such a computer program may be stored or transmitted in a computer-readable medium, such as, but is not limited to, a computer-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions).

What is claimed is:

1. A method, comprising:

receiving, at an interface coupled with target hardware, a request for injecting a first error into the target hardware from software on a system;

determining whether support exists for said first error; and injecting said first error into said target hardware when said support for said first error is determined to exist, wherein said request includes a hierarchy level of granularity related to said first error.

2. The method of claim 1, further comprising sending a return message when said support for said first error is determined not to exist.

3. The method of claim 1, wherein said support for said first error includes support in hardware of said system.

4. The method of claim 1, wherein said support for said first error includes support in emulation firmware of said system.

5. The method of claim 1, wherein said request is a system call.

6. The method of claim 1, wherein said request to indicate a particular component of the target hardware structure in which said first error to occur.

7. The method of claim 1, further comprising receiving a query to request an answer whether support exists for said first error.

8. The method of claim 7, wherein said query to be contained in a system call.

9. The method of claim 8, wherein said answer to be contained in a system call return.

10. A method, comprising:

receiving a request for injecting a first error from software on a system;

determining whether support exists for said first error; and injecting said first error into said system when said support for said first error is determined to exist, wherein said request includes a hierarchy level of granularity related to said first error.

11. The method of claim 10, wherein said hierarchy level of granularity describes a subset of all errors capable of being requested by said request.

12. A method, comprising:

receiving a request for injecting a first error from software on a system;

determining whether support exists for said first error; and injecting said first error into said system when said support for said first error is determined to exist, wherein said request to indicate a level of severity of said first error.

13. A method, comprising:

receiving a request for injecting a first error from software on a system;

determining whether support exists for said first error; and injecting said first error into said system when said support for said first error is determined to exist, wherein said request to indicate a triggering event to time the injection of said first error.

14. A method, comprising:

receiving a request for injecting a first error from software on a system;

determining whether support exists for said first error; and injecting said first error into said system when said support for said first error is determined to exist; and receiving a query to request an answer whether support exists for said first error, wherein said answer to include a hierarchy level of granularity related to said first error.

15. The method of claim 14, wherein said hierarchy level of granularity describes a subset of all errors capable of being requested by said request.

16. A method, comprising:

receiving a request for injecting a first error from software on a system;

determining whether support exists for said first error; and injecting said first error into said system when said support for said first error is determined to exist; and receiving a query to request an answer whether support exists for said first error, wherein said answer to indicate a hardware structure in which said first error to occur.

17. A method, comprising:

receiving a request for injecting a first error from software on a system;

determining whether support exists for said first error; and injecting said first error into said system when said support for said first error is determined to exist; and receiving a query to request an answer whether support exists for said first error, wherein said answer to indicate a level of severity of said first error.

18. A method, comprising:

receiving a request for injecting a first error from software on a system;

determining whether support exists for said first error; and injecting said first error into said system when said support for said first error is determined to exist; and receiving a query to request an answer whether support exists for said first error, wherein said answer to indicate a triggering event to time the injection of said first error.

19. An apparatus, comprising:

means for receiving a request for injecting a first error into target hardware from software on a system;

means for determining whether support exists for said first error; and means for injecting said first error into said target hardware when said support for said first error is determined to exist, wherein said request to indicate a level of severity of said first error.

20. The apparatus of claim 19, further comprising means for sending a return message when said support for said first error is determined not to exist.

21. The apparatus of claim 19, wherein said support for said first error includes support in hardware of said system.

22. The apparatus of claim 19, wherein said support for said first error includes support in emulation firmware of said system.

23. The apparatus of claim 19, wherein said request is a system call.

24. The apparatus of claim 19, wherein said request includes a hierarchy level of granularity related to said first error.

25. The apparatus of claim 24, wherein said hierarchy-level of granularity describes a subset of all errors capable of being requested by said request.

26. The apparatus of claim 19, wherein said request to indicate a particular component of the target hardware structure in which said first error to occur.

27. The method of claim 19, wherein said request to indicate a level of severity of said first error.

28. The apparatus of claim 19, wherein said request to indicate a triggering event to time the injection of said first error.

29. The apparatus of claim 19, further comprising means for receiving a query to request an answer whether support exists for said first error.

30. The apparatus of claim 29, wherein said query to be contained in a system call.

31. The apparatus of claim 30, wherein said answer to be contained in a system call return.

32. The apparatus of claim 29, wherein said answer to include a hierarchy level of granularity related to said first error.

33. The apparatus of claim 32, wherein said hierarchy level of granularity describes a subset of all errors capable of being requested by said request.

34. The apparatus of claim 29, wherein said answer to indicate a particular component of the target hardware structure in which said first error to occur.

35. The apparatus of claim 29, wherein said answer to indicate a level of severity of said first error.

36. The apparatus of claim 29, wherein said answer to indicate a triggering event to time the injection of said first error.

37. A computer-readable storage media storing software code that, when executed by a processor, causes the processor to perform a process comprising:

receiving a request for injecting a first error into the target hardware from software on a system;

determining whether support exists for said first error; and injecting said first error into said target hardware when said support for said first error is determined to exist, wherein said request to indicate a level of severity of said first error.

38. The computer-readable media of claim 37, further comprising sending a return message when said support for said first error is determined not to exist.

39. The computer-readable media of claim 37, wherein said support for said first error includes support in hardware of said system.

40. The computer-readable media of claim 37, wherein said support for said first error includes support in emulation firmware of said system.

41. The computer-readable media of claim 37, wherein said request is a system call.

42. The computer-readable media of claim 37, wherein said request to indicate a particular component of the target hardware structure in which said first error to occur.

43. The computer-readable media of claim 37, further comprising receiving a query to request an answer whether support exists for said first error.

44. The computer-readable media of claim 43, wherein said query to be contained in a system call.

45. The computer-readable media of claim 44, wherein said answer to be contained in a system call return.

46. A computer-readable media containing software code that, when executed by a processor, performs a process comprising:

receiving a request for injecting a first error from software on a system;

determining whether support exists for said first error; and injecting said first error into said system when said support for said first error is determined to exist, wherein said request includes a hierarchy level of granularity related to said first error.

47. The computer-readable media of claim 46, wherein said hierarchy level of granularity describes a subset of all errors capable of being requested by said request.

48. A computer-readable media containing software code that, when executed by a processor, performs a process comprising:

receiving a request for injecting a first error from software on a system;

determining whether support exists for said first error; and injecting said first error into said system when said support for said first error is determined to exist, wherein said request to indicate a level of severity of said first error.

49. A computer-readable media containing software code that, when executed by a processor, performs a process comprising:

receiving a request for injecting a first error from software on a system;

determining whether support exists for said first error; and injecting said first error into said system when said support for said first error is determined to exist, wherein said request to indicate a triggering event to time the injection of said first error.

50. A computer-readable media containing software code that, when executed by a processor, performs a process comprising:

receiving a request for injecting a first error from software on a system;

determining whether support exists for said first error;

receiving a query to request an answer whether support exists for said first error; and injecting said first error into said system when said support for said first error is determined to exist, wherein said answer to include a hierarchy level of granularity related to said first error.

51. The computer-readable media of claim 50, wherein said hierarchy level of granularity describes a subset of all errors capable of being requested by said request.

52. A computer-readable media containing software code that, when executed by a processor, performs a process comprising:

receiving a request for injecting a first error from software on a system;

determining whether support exists for said first error;

receiving a query to request an answer whether support exists for said first error; and injecting said first error into said system when said support for said first error is determined to exist, wherein said answer to indicate a hardware structure in which said first error to occur.

53. A computer-readable media containing software code that, when executed by a processor, performs a process comprising:

receiving a request for injecting a first error from software on a system;

determining whether support exists for said first error;

receiving a query to request an answer whether support exists for said first error; and injecting said first error into said system when said support for said first error is determined to exist, wherein said answer to indicate a level of severity of said first error.

54. A computer-readable media containing software code that, when executed by a processor, performs a process comprising:

receiving a request for injecting a first error from software on a system;

determining whether support exists for said first error;

receiving a query to request an answer whether support exists for said first error; and injecting said first error into said system when said support for said first error is determined to exist, wherein said answer to indicate a triggering event to time the injection of said first error.

55. An apparatus, comprising:

an interface coupled with target hardware including:

a first module to receive a request for injecting a first error into said target hardware from software on a system;

a second module coupled with said first module to determine whether support exists for said first error; and a third module coupled with said first module and said second module to inject said first error into said target hardware when said second module determines said support for said first error exists, wherein said request includes a hierarchy level of granularity related to said first error.

56. The apparatus of claim 55, wherein said first module to send a return message to said software when said second module determines said support for said first error does not exist.

57. The apparatus of claim 55, wherein said support is performed by hardware of said apparatus.

58. The apparatus of claim 55, wherein said support is performed by emulation firmware of said apparatus.

59. The apparatus of claim 58, wherein said first module to decode from said request a hierarchy level of granularity to describe a subset of all errors capable of being requested by said request.

60. The apparatus of claim 55, wherein said first module to decode from said request a particular component of the hardware structure in which said first error to occur.

61. The apparatus of claim 55, wherein said first module to decode from said request a level of severity of said first error.

62. The apparatus of claim 55, wherein said first module to decode from said request a triggering event to time the injection of said first error.

63. The apparatus of claim 55, wherein said first module to receive a query and to send an answer whether support exists for said first error.

64. The apparatus of claim 63, wherein said answer to include a hierarchy level of granularity related to said first error.

65. The apparatus of claim 64, wherein said hierarchy level of granularity describes a subset of all errors capable of being requested by said request.

66. The apparatus of claim 63, wherein said answer to indicate a particular component of the target hardware structure in which said first error to occur.

67. The apparatus of claim 63, wherein said answer to indicate a level of severity of said first error.

68. The apparatus of claim 63, wherein said answer to indicate a triggering event to time the injection of said first error.

69. A system, comprising:

a firmware interface coupled with target hardware, the firmware interface to perform the following:

to receive a request for injecting a first error into the target hardware, to determine whether support exists for said first error, and to inject said first error into the target hardware when said support for said first error exists, wherein said request to indicate a level of severity of said first error; and target hardware to receive said first error and to send an error message.

70. The system of claim 69, further comprising software coupled with said firmware via an interface to send said request.

71. The system of claim 70, wherein said software to receive said error message from said hardware.

72. The system of claim 70, wherein said firmware to send a return message to said software when said firmware determines said support for said first error does not exist.

73. The system of claim 70, wherein said support is performed by said hardware.

74. The system of claim 70, wherein said support is performed by emulation firmware of said firmware.

75. The system of claim 70, wherein said firmware to receive a query from said software and to send an answer to said software whether support exists for said first error.

76. A system, comprising:

firmware to receive a request for injecting a first error, to determine whether support exists for said first error, and to inject said first error when said support for said first error exists;

hardware to receive said first error and to send an error message; and software coupled with said firmware via an interface to send said request, wherein said firmware to decode from said request a hierarchy level of granularity to describe a subset of all errors capable of being requested by said request.

77. The system of claim 70, wherein said firmware to decode from said request a particular component of the target hardware structure in which said first error to occur.

78. A system, comprising:

firmware to receive a request for injecting a first error, to determine whether support exists for said first error, and to inject said first error when said support for said first error exists;

hardware to receive said first error and to send an error message; and software coupled with said firmware via an interface to send said request, wherein said firmware to decode from said request a level of severity of said first error.

79. A system, comprising:

firmware to receive a request for injecting a first error, to determine whether support exists for said first error, and to inject said first error when said support for said first error exists;

hardware to receive said first error and to send an error message; and software coupled with said firmware via an interface to send said request, wherein said firmware to decode from said request a triggering event to time the injection of said first error.

80. A system, comprising:

firmware to receive a request for injecting a first error, to determine whether support exists for said first error, and to inject said first error when said support for said first error exists;

hardware to receive said first error and to send an error message; and software coupled with said firmware via an interface to send said request, wherein said firmware to receive a query from said software and to send an answer to said software whether support exists for said first error, and wherein said answer to include a hierarchy level of granularity related to said first error.

* * * * *

UNITED STATES PATENT AND TRADEMARK OFFICE

CERTIFICATE OF CORRECTION

PATENT NO. : 7,587,639 B2
APPLICATION NO. : 10/985502
DATED : September 8, 2009
INVENTOR(S) : Marisetty et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1001 days.

Signed and Sealed this

Twenty-first Day of September, 2010

David J. Kappos

*Director of the United States Patent and Trademark Office*